Figure 1:
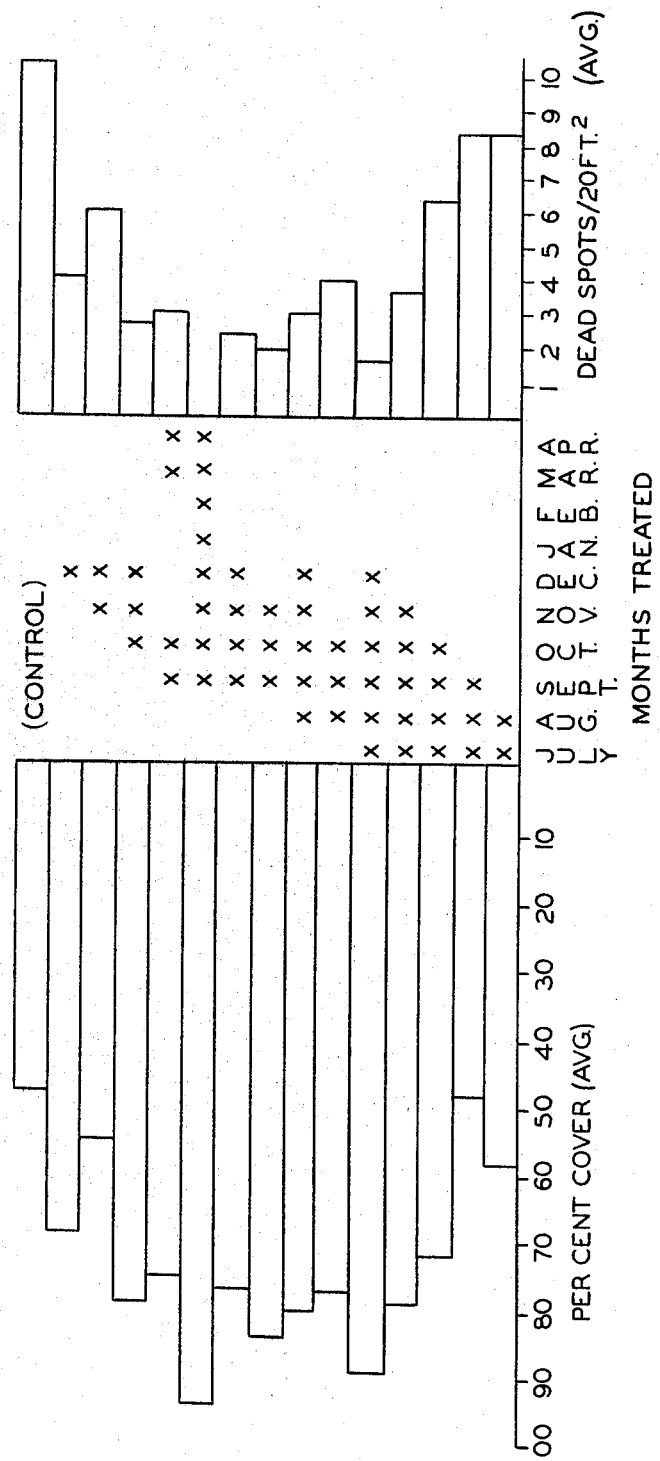

June 6, 1967 W. A. SMALL 3,323,985
PROCESS FOR CONTROLLING SPRING DEAD SPOT ON GRASS
Filed July 13, 1964

William A. Small,
Inventor
Koenig, Senniger, Powers and Leavitt,
Attorneys.

United States Patent Office 3,323,985
Patented June 6, 1967

3,323,985
PROCESS FOR CONTROLLING SPRING DEAD SPOT ON GRASS
William A. Small, Ferguson, Mo., assignor to Mallinckrodt Chemical Works, St. Louis, Mo., a corporation of Missouri
Filed July 13, 1964, Ser. No. 382,205
10 Claims. (Cl. 167—22)

This invention relates to turf disease control and more particularly to methods of controlling the spring dead spot disease which attacks Bermuda grass.

This application is a continuation-in-part of my copending, coassigned application Ser. No. 214,478, filed Aug. 3, 1962, now abandoned.

Briefly, the present invention is directed to the process of controlling dead spot by periodically treating a susceptible grass with a water-soluble dithiocarbamate selected from the group consisting of disodium ethylenebisdithiocarbamate, sodium N,N-dimethyldithiocarbamate, sodium ammonium ethylenebisdithiocarbamate and potassium propylenebisdithiocarbamate, said treatment including at least one application of said water-soluble dithiocarbamate to the grass prior to the beginning of the semi-dormant period of the grass, at least one application of said water-soluble dithiocarbamate to the grass during the semi-dormant period of the grass and at least one application of said water-soluble dithiocarbamate to the grass during the dormant period of the grass.

The control of various fungus diseases of plants by the simple application of various derivatives of dithiocarbamic acid, formulated conventionally as sprays, dusts, etc., is well known. An exemplary process of the type mentioned is disclosed in Hester Reissue Patent 23,742, reissued Nov. 24, 1953. This patent shows the fungicidal use of certain salts of alkylene bisdithiocarbamic acids, for example the ferric, sodium, cupric, and zinc salts of ethylenebisdithiocarbamic acid. Similar applications of other dithiocarbamates such as salts of N-methyldithiocarbamic acid and N,N-dimethyldithiocarbamic acid are also known.

Likewise, the control of fungus diseases of fine turf grasses by the simple application of a variety of fungicidal agents is well known. Examples include the use of mercurial fungicides for controlling the diseases commonly known as brown patch and snow mold and of cadmium-based fungicides for controlling the diseases commonly known as dollar spot, copper spot and pink patch.

During the last several years, particularly throughout the southern and central portions of the United States, certain types of grasses known collectively as Bermuda grasses, which are particularly adapted to the hot, humid, summer climate of these regions, have gained increasing popularity. While these grasses are, to a certain extent, subject to attack by the conventional fungus turf diseases, such as those mentioned above, control of such diseases by conventional methods has also been effective.

Recently, however, a different disease entity, known as "spring dead spot," has come to be recognized among those familiar with Bermuda grasses. (See D. F. Wadsworth and H. C. Young, Jr., "Spring Dead Spot of Bermuda Grass," Plant Disease Reporter, 44, 516, July 15, 1960.) This disease has been taking an increasing toll of Bermuda grass turf. While the casual agent (or agents) of spring dead spot has not been isolated and identified, it is suspected that one or more fungi are involved. Nevertheless, conventional methods of controlling fungus diseases of turf have failed to be effective against spring dead spot.

The growth habit of Bermuda grasses is characterized by four more or less distinct periods, which correspond loosely to the four seasons.

The emergent period is characterized by the appearance of new green blades and relatively slow growth thereof under the influence of the warm days and cool nights of the spring season. This period generally embraces the months of April and May in the area of St. Louis, Missouri.

The active growth period embraces the hot summer months, and may be generally said to include the months of June through August in the St. Louis area. As a rule of thumb, one may say that well kept Bermuda turf requires mowing two or more times a week during the active growth period.

With the arrival of cooler nights in the fall, Bermuda grass enters a semi-dormant period in which the rate of growth is decreased, although the grass maintains its normal green color. The onset of the semi-dormant period is indicated by the reduction of required mowing frequency to approximately once a week. The semi-dormant period generally embraces the period from early September to mid October in the St. Louis area.

With the occurrence of the first killing frost, Bermuda grass enters a dormant period, which lasts through the Winter until the onset of the next emergent period the following spring. During the dormant period, Bermuda grasses are brown, as contrasted with cool weather grasses such as blue grass, which in many areas remain green throughout the winter.

The onset and duration of each of the four characteristic periods varies from one locality to another and from year to year, as climatic conditions vary.

Spring dead spot apparently attacks during the semi-dormant and dormant periods, and it is difficult to diagnose the onset of the disease until the following emergent period in the spring.

Among the objects of the invention may be mentioned the provision of improved methods of controlling turf diseases; the provision of effective methods of controlling spring dead spot; and the provision of methods of controlling diseases of Bermuda grass. Other objects and features will be in part apparent and in part pointed out hereinafter.

The invention accordingly comprises the methods hereinafter described, the scope of the invention being indicated in the following claims.

The single sheet of drawings (FIG. 1) shows a bar graph which graphically displays certain test results obtained through the practice of the invention as described hereinafter in Example 8.

In accordance with the present invention, it has now been found that spring dead spot may be controlled by periodically treating a susceptible grass with a water-soluble dithiocarbamate prior to and during the dormant period of the grass.

Although water-soluble dithiocarbamates generally are effective, the disodium salt of ethylenebisdithiocarbamic acid has been found to be a particularly effective agent for use in the process of the present invention. Following are examples of other water-soluble dithiocarbamates useful in the processes of the invention:

Sodium N,N-dimethyldithiocarbamate
Sodium ammonium ethylenebisdithiocarbamate
Potassium propylenebisdithiocarbamate Other members of the class will be obvious to those skilled in the art.

While the water-soluble dithiocarbamate may be applied in a formulation in which it is the only active ingredient, it may also be combined with other agents known to be effective in controlling various turf grass diseases, in order to provide a broad spectrum of control. For example it may be formulated with known insoluble cadmium and/or mercurial turf fungicides to provide effective control of conventional turf diseases as well as control of spring dead spot. Soluble cadmium or mercurial agents are incompatible since they tend to form insoluble dithiocarbamate salts.

Since the casual organism of spring dead spot seems to attack the root system of Bermuda grasses, the best control is obtained when the water-soluble dithiocarbamate is applied in conjunction with fairly heavy watering, so that the soluble fungicidal agent is leached into intimate contact with the root system of the grass.

In general, it has been found that spring dead spot may be satisfactorily and adequately controlled by treating a susceptible grass with a water-soluble dithiocarbamate, preferably disodium ethylenebisdithiocarbamate, the treatment including at least one application of the dithiocarbamate to the grass prior to the beginning of the dormant period of the grass and at least one application of the dithiocarbamate to the grass during the dormant period of the grass. It has further been found that improved control of the diseases is achieved if the treatment includes at least one application of a water-soluble dithiocarbamate to the grass prior to the beginning of the semi-dormant period of the grass, at least one application of the dithiocarbamate to the grass during the semi-dormant period of the grass and at least one application of the dithiocarbamate to the grass during the dormant period of the grass. Preferably, for best results, the treatment includes at least one application of a water-soluble dithiocarbamate to the grass prior to the beginning of the semi-dormant period of the grass and monthly applications of the dithiocarbamate to the grass throughout the semi-dormant and dormant periods of the grass.

In a preferred embodiment of the process of the invention, disodium ethylenebisdithiocarbamate (nabam) is applied at approximately monthly intervals at the rate of approximately 8 oz. of the fungicide in 25–30 gallons of water, followed by about 50 gallons of water, for each thousand square feet of turf, beginning before the onset of the semi-dormant period and continuing throughout the semi-dormant and dormant period of the grass. Normally, a minimum of four monthly applications is required for effective control in the northern portion of the Bermuda grass region, where the dormant period normally lasts six months or more. Fewer applications are often adequate in areas where the dormant period is shorter than five months.

Best results on fairway or lawn turf are achieved at the 8 oz./1000 sq. ft. dosage schedule indicated above. However, on fine leaf Bermuda grasses, such as those used on putting greens, lower dosages, down to about 4 oz./1000 sq. ft. usually provide adequate disease control.

The following examples illustrate the invention.

*Example 1*

A test area was laid out on a golf course fairway in St. Louis County, Missouri. The area selected had for several years supported a good stand of the U-3 variety of Bermuda grass, but during the season or seasons immediately prior to the institution of this test program the area had become heavily infested with spring dead spot disease. A regular series of test plots (each 3 ft. by 50 ft.) was laid out in the general test area and a variety of treatments was applied to the test plots in accordance with Table 1.

TABLE 1.—U–3 BERMUDA FAIRWAY TREATMENTS FIRST YEAR

| Treatment No. | Active Agent | Dosage (per 1,000 sq. ft.) | Application Date | | | Comments on Active Agent, etc. |
|---|---|---|---|---|---|---|
| | | | Sept. | Nov. | Mar. | |
| 1 | Dieldrin, 18% | 6 oz | x | x | | Broad Spectrum Insecticide. |
| 2 | Chlordane, 40% | 4 lbs | x | x | | Broad Spectrum Insecticide (U.S. Pat. 2,509,160). |
| 3 | Lead Arsenate, 96% | 4 lbs | x | | | Insecticide. |
| 4 | Dieldrin 18% | 6 oz | x | x | x | Broad Spectrum Insecticide. |
| 4a | ----do---- | 6 oz | | | x | Do. |
| 5 | Control (No Treatment) | | | | | |
| 6 | Calo-Clor [1] | 1½ oz | x | | | 60% HgCl, 30% HgCl₂; Standard turf fungicide for over 30 years for control of brown patch, snow mold, dollar spot. |
| 6a | ----do [1]---- | 3 oz | | x | x | |
| 6b | ----do [1]---- | 3 oz | | | x | |
| 7 | Phenylmercuric Acetate, 10% Solution. | 1 oz | x | | | Used for many years as a turf fungicide. |
| 7a | | 2 oz | | x | | |
| 7b | | 2 oz | | | x | |
| 8 | Cadmium Chloride | ⅝ oz | x | | | |
| 8a | ----do---- | 1¼ oz | | x | | |
| 8b | ----do---- | 1¼ oz | | | x | |
| 9 | Cadminate [1] | 1 oz | x | | | 60% Cadmium Succinate; over 15 years of use as turf fungicide for control of dollar spot, copper spot, red thread. |
| 9a | ----do [1]---- | 2 oz | | x | | |
| 9b | ----do [1]---- | 2 oz | | | x | |
| 10 | Calo-Clor [1] | 1½ oz | x | | | |
| 10a | ----do [1]---- | 3 oz | | x | | |
| 11 | Lime | 222 lbs | x | | | |
| 11a | ----do---- | 111 lbs | | | x | |
| 12 | Aluminum Sulfate | 1 lb | x | x | | Ingredient of Calocure commercial turf fungicide formulation. |
| 13 | Ferrous Sulfate | 1 lb | x | x | | |
| 14 | Control | | | | | |
| 15 | Milorganite and Calo-Clor [1] Mixture (80:1). | 7½ lbs | x | | | |
| 15a | ----do [1]---- | 15 lbs | | x | | |
| 15b | ----do [1]---- | 15 lbs | | | x | |
| 16 | Calo-Clor [1] | 1½ oz | x | | | |
| 16a | ----do [1]---- | | | x | x | |
| 16b | ----do [1]---- | | | | | |
| 17 | Fertilizer (3-12-3) | 36 lbs.P₂O₅ | x | | | |
| 17a | ----do---- | 12 lbs.P₂O₅ | | | x | |
| 18 | Fertilizer (3-3-12) | 36 lbs. K₂O | x | | | |
| 18a | ----do---- | 12 lbs. K₂O | | | x | |
| 19 | Fertilizer (12-12-3) | 36 lbs. N | x | | | |
| 19a | ----do---- | 12 lbs. N | | | x | |
| 20 | Control | | | | | |
| 21 | Fertilizer (12-3-12) | 36 lbs. N | x | | | |
| 21a | ----do---- | 12 lbs. N | | | x | |
| 22 | Fertilizer (12-3-3) | 36 lbs. N | x | | | |
| 22a | ----do---- | 12 lbs. N | | | x | |
| 23 | HgCl₂+NaCl (5:2) | 2.1 oz | x | | | |
| 23a | HgCl₂+NaCl (5:2) | 4.2 oz | | x | | |

[1] Registered trademark of Mallinckrodt Chemical Works.

Each treatment was applied to three test plots distributed within the test area. Since the causative agent of the disease was unidentified the treatments included application of several known fungicides and insecticides, as well as applications of lime, fertilizers and herbicides.

Plots receiving treatments designated by numbers 1–14 (except as noted below) were fertilized with 2.4 lbs. urea/1000 sq. ft. in late August or early September in accordance with standard maintenance practice at this golf course. The exceptions to the above fertilization schedule were plots 4a, 6b, 7b, 8b, 9b, and 11a.

The effectiveness of the various treatments on the infected turf was evaluated during the following emergent period of the grass. No significant control of spring dead spot on any of the treated plots was evident from comparisons with the untreated control plots.

*Example 2*

The following supplemental treatments were made on test plots adjacent to those receiving the treatments described in Example 1. Treatment A was begun on separate plots in each of the following months: November, December, January, March and April, and continued monthly through April in each case. Treatment B was begun in November and continued monthly through April.

Treatment A consisted of application of 6 oz. Dyrene 50% wettable powder and 1½ oz. Calo-Clor per 1000 sq. ft. [(Dyrene is 2,4-dichloro-6-(2-chloroanilino)-1,3,5-triazine, U.S. Patent 2,720,480, and is recognized turf fungicide. Calo-Clor is described in Table 1, Treatment No. 6].

Treatment B consisted of applications of 6 oz. Terraclor 75% wettable powder and 1½ oz. Calo-Clor per 1000 sq. ft. (Terraclor is pentachloronitrobenzene and is a recognized soil fungicide).

The treatments were evaluated as outlined in Example 1. Again, no significant control of Spring Dead Spot was evident from comparisons of the treated plots with untreated control plots.

*Example 3*

The following experimental work was carried out during the season following the work described in Examples 1 and 2. The same test area and the same general plan used the previous season were again utilized. The detailed treatment schedule used is outlined in Table 2. In general the desired dosage of treating agent was suspended or dissolved in water and 25–30 gallons of the suspension/solution applied per thousand square feet of turf. In most cases, as is indicated in Table 2, treatment was begun in September or January and repeated at intervals of approximately one month (as permitted by the weather) through the following April. In the last four treatments listed in the table (1B–4B) only single applications were made. During the fall and spring months, when the fairway irrigation system was available, the treating agents were watered in immediately after application.

TABLE 2.—SECOND SEASON TREATMENTS U-3 BERMUDA FAIRWAY

| No. | Treatment | Rate/1,000 sq. ft. | Application Time | | | | | | | | Comments on Treating Agent |
|---|---|---|---|---|---|---|---|---|---|---|---|
| | | | Sept. | Oct. | Nov. | Dec. | Jan. | Feb. | Mar. | Apr. | |
| 1 | Dieldrin 18% (A)+MF-90 (B) | 6 oz. A+3 oz. B | + | + | + | + | + | + | + | + | (B)=66% Dexon (Sodium p-dimethylaminobenzenediazosulfonate) plus malachite green and inerts-fungicide. |
| 1A | do | 6 oz. A+3 oz. B | − | − | − | − | + | + | + | + | |
| 2 | Zytron 35% | 64 oz | + | − | − | − | − | − | − | − | Zytron=O-(2,4-dichlorophenyl)-O-methyl-N-(isopropyl)-phosphoramidothioate-Herbicide. |
| 3 | Lead Arsenate | 4 lbs | + | − | − | − | − | − | − | − | |
| 4 | Dieldrin 18% | 20 oz | + | + | + | + | + | + | + | + | |
| 4A | do | 20 oz | − | − | − | − | + | + | + | + | |
| 5 | Dylox 50% | 5 oz | + | + | + | + | + | + | + | + | |
| 5A | do | 5 oz | − | − | − | − | + | + | + | + | Dylox=Dimethyl (2,2,2-trichloro-1-hydroxyethyl) phosphate-insecticide. |
| 6 | Control | | | | | | | | | | |
| 7 | MF-96 | 6 oz | + | + | + | + | + | + | + | + | |
| 7A | MF-96 | 6 oz | − | − | − | − | + | + | + | + | These are the formulation and treatments set forth in Example 5 below. |
| 8 | Nabam 93% | 4 oz | + | + | + | + | + | + | + | + | Formulation and treatments set forth in Example 4 below. |
| 8A | do | 4 oz | − | − | − | − | + | + | + | + | |
| 9 | Cadminate¹ | 2 oz | + | + | + | + | + | + | + | + | Cadminate=Turf fungicide formulation containing 60% cadmium succinate. See Table 1, Treatment No. 9. |
| 9A | do | 2 oz | − | − | − | − | + | + | + | + | |
| 10 | MF-88 | 12 oz | + | + | + | + | + | + | + | + | MF-88=An experimental cadmium chromate complex fungicide. |
| 10A | MF-88 | 12 oz | − | − | − | − | + | + | + | + | |
| 11 | Lime | 222 lbs | + | − | − | − | − | − | − | − | |
| 12 | Lime (A)+urea (B) | 222 lbs. A+18 lbs. B | + | − | − | − | − | − | − | − | |
| 13 | MF-108 | 8 oz | + | + | + | + | + | + | + | + | MF-108=A smelter flue dust containing 15.3% cadmium. |
| 13A | MF-108 | 8 oz | − | − | − | − | + | + | + | + | |
| 14 | MF-114 Granular | 60 oz | − | + | + | + | + | + | + | + | MF-114=A spent mercury catalyst. |
| 14A | do | 60 oz | − | − | − | − | + | + | + | + | |
| 15 | Calo-Clor¹ | 3 oz | + | + | + | + | + | + | + | + | Calo-Clor=60% HgCl+30% HgCl₂. See Table 1, Treatment No. 6. |
| 15A | do¹ | 3 oz | − | − | − | − | + | + | + | + | |
| 16 | Control | | | | | | | | | | |
| 17 | MF-105 | 6 oz | + | + | + | + | + | + | + | + | MF-105=Hercules 3944 (5-chloro-4-phenyl-1,2-dithiole-3-one) (50%)- an experimental turf fungicide. |
| 17A | MF-105 | 6 oz | − | − | − | − | + | + | + | + | |
| 18 | Phygon XL | 8 oz | + | + | + | + | + | + | + | + | Phygon XL=2,3-dichloro-1,4-naphtoquinone (commercial fungicide). |
| 18A | do | 8 oz | − | − | − | − | + | + | + | + | |
| 19 | Fumazon 70E | 128 oz | + | − | − | − | − | − | − | − | Fumazone 70E=1,2-dibromo-3-chloropropane (commercial nematocide). |
| 19A | do | 64 oz | − | − | − | − | + | − | − | − | |

TABLE 2.—SECOND SEASON TREATMENTS U-3 BERMUDA FAIRWAY—Continued

| No. | Treatment | Rate/1,000 sq. ft. | Application Time ||||||| Comments on Treating Agent |
|---|---|---|---|---|---|---|---|---|---|---|
| | | | Sept. | Oct. | Nov. | Dec. | Jan. | Feb. | Mar. | Apr. | |
| 20 | MF-90 | 6 oz | + | + | + | + | + | + | + | + | MF-90—See Treatment No. 1 of this table. |
| 20A | MF-90 | 6 oz | − | − | − | − | + | + | + | + | Captan 50W = N-trichloro-methylmercapto-4-cyclohexene-1,2-dicarboximide (commercial fungicide). |
| 21 | Captain 50W | 12 oz | + | + | + | + | + | + | + | + | |
| 21A | do | 12 oz | − | − | − | − | + | + | + | + | |
| 22 | MF-110 | 10 lbs | + | + | + | + | + | + | + | + | MF-110 = *Trichoderma viride* (a saprophytic fungus) on wheat. |
| Additional Treatments: | | | | | | | | | | | |
| 1B | Gypsum | 222 lbs | − | − | − | − | − | + | − | − | See Treatment No. 2 above. |
| 2B | Zytron | 32 oz | − | − | − | − | − | − | + | − | Zineb = Zinc ethylenebis-dithiocarbamate (insoluble). |
| 3B | Zineb | 1 lb | − | − | − | − | − | − | + | − | |
| 4B | Fumazone 70E | 64 oz | − | − | − | − | − | − | + | − | See Treatment No. 19 above. |

1 Registered trademark of Mallinckrodt Chemical Works.

The condition of the test plots was finally evaluated in the latter part of May, after growth of healthy Bermuda grass was well established. No significant control of spring dead spot was evident from comparison of the treated plots with the control plots, with the following exceptions:

(a) In the case of treatment No. 1 (8 monthly applications of Dieldrin insecticide plus MF-90 fungicide) there was a slight improvement in the number of viable stolons in the dead spot areas.

(b) In the case of treatments Nos. 7 and 8 (see Examples 5 and 4 below) the dead spot areas had substantially filled in with new growth.

*Example 4*

A commercial fungicide formulation containing approximately 93% disodium ethylenebisdithiocarbamate and 7% inert ingredients was applied at the rate of 4 oz. in 25–30 gallons of water per thousand square feet of turf to test plots on a U-3 Bermula grass golf fairway in St. Louis County, Missouri. This fairway was known to be subject to heavy infestation by spring dead spot. Treatment was begun in September and repeated at intervals of approximately one month (as permitted by the weather) through the following April. During the fall and spring months, when the fairway irrigation system was available, the fungicide was watered in immediately after application. The test plots thus treated emerged from the dormant period with a luxuriant growth of turf that was essentially free of disease.

In contrast, both untreated control plots and plots treated with conventional turf fungicides were badly infested with spring dead spot. Adjacent test plots treated with disodium ethylenebisdithiocarbamate at the same dosage schedule but beginning in January and continuing through April were also badly infested with the disease.

*Example 5*

Additional test plots on the fairway referred to in Example 4 were treated with the following formulation:

| | Lbs. |
|---|---|
| 93% disodium ethylenebisdithiocarbamate fungicide of Example 1 | 66.7 |
| Potassium chromate | 10 |
| Cadmium sebacate | 20 |
| Wetting agent (Renex 35—product of Atlas Powder Co.) | 3.3 |

The formulation was applied at the rate of 6 oz. in 25–30 gallons of water per thousand square feet of turf. During the fall and spring months, when the fairway irrigation system was available, the fungicide was watered in immediately after application. A normal turf developed in the spring, comparable to that on the plots described in Example 4. Also, as in Example 4, the disease was not arrested on plots where the treatment was begun in January.

*Example 6*

A formulation having the composition:

| | Lbs. |
|---|---|
| Disodium ethylenebisdithiocarbamate | 85 |
| Non-ionic wetting agent (Triton X–120—product of Rohm & Haas Co.) | 5 |
| Clay | 10 | was applied to Bermuda grass subject to infection by spring dead spot according to the dosage schedule outlined in Example 4. In the spring the turf was virtually free of the disease.

The following data were obtained from U-3 Bermuda fairway test plots on the golf course referred to in Example 1 during a season subsequent to those on which the preceding examples were based.

To facilitate evaluation of the test plots and to eliminate interfering effects due to the competitive growth of annual grasses, such as *Poa annua*, and weeds, the test area was treated with a selective herbicide (sodium arsenite), to which Bermuda grass is resistant, about a week prior to the beginning of evaluation.

*Example 7*

A formulation (MF–171) containing 85% nabam (disodium ethylenebisdithiocarbamate) and 15% inert ingredients (wetting agent, clay) was applied to triplicate test plots at the dosage schedules and with the results indicated in Table 3.

Applications were made at approximately monthly intervals, beginning in July and continuing through the following April. The results in the table were obtained late in June following the terminal April application. The indicated amount of fungicide formulation (Col. 1) suspended in the indicated volume of water (Col. 2) was applied, followed by a water "drench" of the indicated volume (Col. 3). At the time of the final evaluation the percent of the test plot area covered with grass (Columns 4, 6, 8) and the number of remaining dead spots (Columns 5, 7, 9) were recorded. Averages for each were calculated (Columns 10, 12), as well as the range between the extreme values for each set of triplicate plots (Columns 11, 13).

TABLE 3

| Dosage/1,000 ft.² | | | Cover and No. of Dead Spots After Treatment Schedule | | | | | | Average | | | |
|---|---|---|---|---|---|---|---|---|---|---|---|---|
| F-171/Water | | Water Drench | Plot A | | Plot B | | Plot C | | | | | |
| (oz.) | (gal.) | (gal.) | Percent Cover | No. D.S. | Percent Cover | No. D.S. | Percent Cover | No. D.S. | Cover (percent) | Range (percent) | No. D.S. | Range |
| 1 | 2 | 3 | 4 | 5 | 6 | 7 | 8 | 9 | 10 | 11 | 12 | 13 |
| 0 | 0 | 0 | 75 | 8 | 85 | 9 | 75 | 15 | 78 | 10 | 10.7 | 7 |
| 1 | 25 | 0 | 65 | 18 | 85 | 11 | 55 | 15 | 68 | 30 | 14.7 | 6 |
| 2 | 25 | 0 | 90 | 4 | 90 | 5 | 60 | 14 | 80 | 30 | 7.7 | 9 |
| 4 | 25 | 0 | 60 | 16 | 95 | 5 | 88 | 9 | 81 | 35 | 10 | 11 |
| 4 | 10 | 15 | 65 | 12 | 93 | 5 | 50 | 17 | 69 | 43 | 11.3 | 12 |
| 4 | 15 | 10 | 90 | 5 | 90 | 10 | 99 | 1 | 93 | 9 | 5.3 | 9 |
| 4 | 10 | 50 | 50 | 14 | 85 | 10 | 88 | 6 | 73 | 38 | 10 | 8 |
| 4 | 25 | 50 | 75 | 11 | 95 | 2 | 90 | 4 | 87 | 20 | 5.7 | 9 |
| *4 | 25 | 50 | 85 | 7 | 95 | 5 | 96 | 4 | 92 | 11 | 5.3 | 3 |
| 6 | 25 | 50 | 90 | 2 | 97 | 3 | 99 | 1 | 95 | 9 | 2 | 2 |
| 8 | 25 | 50 | 95 | 2 | 99 | 1 | 100 | 0 | 98 | 5 | 1 | 2 |

*4 oz. of 93% nabam/1,000 ft.²

*Example 8*

The MF-171 formulation (85% nabam) was applied to triplicate test plots at a dosage of 8 oz. MF-171 in 25 gallons of water per thousand square feet, followed by a drench of 50 gallons of water per thousand square feet. The treatment schedules and results are displayed graphically in FIG. 1. The treatments shown for the month of October occurred during the semi-dormant period of the grass treated and prior to the dormant period of the grass. The percent cover results were evaluated in May, early in the emergent period, experience having shown that this is the best time to evaluate this index. The number of dead spots per plot was evaluated about five weeks later when the growth of the grass had proceeded sufficiently to make it possible to delineate individual dead spots satisfactorily.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. The process of controlling spring dead spot which comprises treating a susceptible grass with a water-soluble dithiocarbamate selected from the group consisting of disodium ethylene-bisdithiocarbamate, sodium N,N-dimethyl dithiocarbamate, sodium ammonium ethylenebisdithiocarbamate and potassium propylenebisdithiocarbamate, said treatment including at least one application of said water-soluble dithiocarbamate to the grass prior to the beginning of the semi-dormant period of the grass, at least one application of said water-soluble dithiocarbamate to the grass during the semi-dormant period of the grass and at least one application of said water-soluble dithiocarbamate to the grass during the dormant period of the grass.

2. The process of controlling spring dead spot which comprises treating a susceptible grass with a water-soluble dithiocarbamate selected from the group consisting of disoduim ethylenebisdithiocarbamate, sodium N,N-dimethyldithiocarbamate, sodium ammonium ethylenebisdithiocarbamate and potassium propylenebisdithiocarbamate, said treatment including at least one application of said water-soluble dithiocarbamate to the grass prior to the beginning of the semi-dormant period of the grass and monthly applications of said water-soluble dithiocarbamate to the grass throughout the semi-dormant and dormant periods of the grass.

3. The process of controlling spring dead spot which comprises periodically treating a susceptible grass with an aqueous solution of disodium ethylenebisdithiocarbamate, said treatment including at least one application of said aqueous solution to the grass prior to the beginning of the semi-dormant period of the grass, at least one application of said aqueous solution to the grass during the semi-dormant period of the grass and at least one application of said aqueous solution to the grass during the dormant period of the grass.

4. The process of controlling spring dead spot which comprises periodically treating a susceptible grass with an aqueous solution of disodium ethylenebisdithiocarbamate, said treatment including at least one application of said aqueous solution to the grass prior to the beginning of the semi-dormant period of the grass and monthly applications of said aqueous solution to the grass throughout the semi-dormant and dormant periods of the grass.

5. The process of controlling spring dead spot as defined in claim 3 wherein said susceptible grass is Bermuda grass.

6. The process of controlling spring dead spot as defined in claim 4 wherein said susceptible grass is Bermuda grass.

7. The process of controlling spring dead spot which comprises treating Bermuda grass at approximately monthly intervals with a water solution of disodium ethylenebisdithiocarbamate at a dosage of at least approximately 4 oz. per thousand sq. ft., said treatment being initiated prior to the beginning of the semi-dormant period of the grass and continuing substantially throughout the semi-dormant and dormant periods of the grass.

8. The process of controlling spring dead spot which comprises treating Bermuda grass at approximately monthly intervals with a water solution of disodium ethylenebisdithiocarbamate at a dosage of at least 4 oz. in approximately 25 gallons of water per thousand sq .ft., followed by a drench of at least an equal volume of water, said treatment being initiated prior to the beginning of the semi-dormant period of the grass and continuing for at least one month during the semi-dormant and dormant periods of the grass.

9. The process of controlling spring dead spot which comprises treating Bermuda grass at approximately monthly intervals with a water solution of disodium ethylenebisdithiocarbamate at a dosage of approximately 8 oz. in approximately 25 gallons of water per thousand sq. ft., followed by a water drench at a rate of about 50 gallons per thousand sq ft., said treatment being initiated prior to the beginning of the semi-dormant period of the grass and continuing through at least one month of the semi-dormant and dormant periods of the grass.

10. The process of controlling spring dead spot which comprises treating Bermuda grass at approximately monthly intervals with a water solution of disodium ethylenebisdithiocarbamate at a dosage of approximately 8 oz. in approximately 25 gallons of water per thousand sq. ft., followed by a water drench at a rate of about 50 gallons per thousand sq. ft., said treatment being initiated prior to the beginning of the semi-dormant period of the grass and continuing substantially throughout the semi-dormant and dormant periods of the grass.

References Cited

UNITED STATES PATENTS

| | | | |
|---|---|---|---|
| 2,317,765 | 4/1943 | Hester | 167—22 |
| 2,844,623 | 7/1958 | Fike | 167—22 |
| 2,845,453 | 7/1958 | Brooks | 167—22 |
| 3,050,439 | 8/1962 | Nemec et al. | 167—22 |

OTHER REFERENCES

The Plant Disease Reporter, U.S. Dept. of Agriculture, vol. 44, No. 7, July 15, 1960, pp. 516–518.

ALBERT T. MEYERS, *Primary Examiner.*

JULIAN S. LEVITT, *Examiner.*

GEORGE A. MENTIS, *Assistant Examiner.*